(12) United States Patent
Childress et al.

(10) Patent No.: US 10,127,525 B2
(45) Date of Patent: Nov. 13, 2018

(54) ENHANCED E-MAIL RETURN RECEIPTS BASED ON COGNITIVE CONSIDERATION

(71) Applicant: International Business Machines Corporation, Armonk, NY (US)

(72) Inventors: Rhonda L. Childress, Austin, TX (US); Itzhack Goldberg, Hadera (IL); James Robert Kosloski, New Fairfield, CT (US); Clifford A. Pickover, Yorktown Heights, NY (US); Neil Sondhi, Budapest (HU)

(73) Assignee: International Business Machines Corporation, Armonk, NY (US)

( * ) Notice: Subject to any disclaimer, the term of this patent is extended or adjusted under 35 U.S.C. 154(b) by 729 days.

(21) Appl. No.: 14/750,154

(22) Filed: Jun. 25, 2015

(65) Prior Publication Data
US 2016/0379127 A1    Dec. 29, 2016

(51) Int. Cl.
*G06Q 10/10* (2012.01)
*H04L 12/58* (2006.01)
*G06N 99/00* (2010.01)

(52) U.S. Cl.
CPC .................................. *G06Q 10/107* (2013.01)

(58) Field of Classification Search
None
See application file for complete search history.

(56) References Cited

U.S. PATENT DOCUMENTS

| 7,774,422 | B2 | 8/2010 | DeLaCruz | |
| 8,555,178 | B2 | 10/2013 | Blair | |
| 8,862,519 | B2 * | 10/2014 | O'Sullivan | G06Q 10/10 706/11 |
| 9,026,598 | B2 | 5/2015 | Kumar et al. | |
| 2004/0243679 | A1 * | 12/2004 | Tyler | G06Q 10/107 709/206 |
| 2004/0249776 | A1 * | 12/2004 | Horvitz | G06Q 10/109 706/21 |
| 2006/0084450 | A1 | 4/2006 | Dam Nielsen et al. | |
| 2007/0043866 | A1 * | 2/2007 | Garbow | G06Q 10/107 709/226 |
| 2007/0073816 | A1 | 3/2007 | Kumar et al. | |

(Continued)

OTHER PUBLICATIONS

Anonymous Inventors; Ttl: Effective method of communication for notification and acknowledgement; Oct. 21, 2013; Database: ip.com; ip.com No. IPCOM000232136D.

*Primary Examiner* — Paulinho E Smith
(74) *Attorney, Agent, or Firm* — Cahn & Samuels, LLP

(57) ABSTRACT

An embodiment of the invention provides a method for enhanced e-mail return receipts based on cognitive considerations. An input device receives an expected response time from a sender of an electronic message, wherein the expected response time includes the amount of time that the sender expects to receive a response to the electronic message. A processor generates a likelihood that the recipient of the electronic message will respond to the electronic message within the expected response time based on a profile of the recipient. The profile of the recipient includes the recipient's degree of attentiveness to the electronic message, the recipient's workload, the recipient's efficiency, and the recipient's work habits. A communications device presents the likelihood that the recipient will respond to the electronic message within the expected response time to the sender.

18 Claims, 7 Drawing Sheets

(56) References Cited

U.S. PATENT DOCUMENTS

| | | |
|---|---|---|
| 2008/0104175 A1 | 5/2008 | Keohane et al. |
| 2008/0104177 A1 | 5/2008 | Keohane et al. |
| 2010/0169264 A1* | 7/2010 | O'Sullivan ............ G06Q 10/10 706/52 |
| 2010/0250682 A1* | 9/2010 | Goldberg ............. G06Q 10/107 709/206 |
| 2011/0153753 A1* | 6/2011 | Childress ................ H04L 51/12 709/206 |
| 2013/0325755 A1* | 12/2013 | Arquette ................ H04L 51/32 706/12 |
| 2014/0115077 A1* | 4/2014 | Cunningham .......... H04L 51/02 709/206 |
| 2015/0042555 A1 | 2/2015 | Vertegaal et al. |
| 2016/0197865 A1* | 7/2016 | Kim ........................ H04L 51/06 709/206 |
| 2016/0366084 A1* | 12/2016 | Malahy .................... G10L 13/02 |
| 2016/0379127 A1* | 12/2016 | Childress ............. G06Q 10/107 706/11 |
| 2017/0171142 A1* | 6/2017 | Arquette ................ H04L 51/32 |
| 2017/0208027 A1* | 7/2017 | Goldstein ............... H04L 51/22 |
| 2018/0026926 A1* | 1/2018 | Nigam ................. G06N 99/005 |
| 2018/0048610 A1* | 2/2018 | Malahy ............ H04M 1/72552 |

\* cited by examiner

ENHANCED E-MAIL RETURN RECEIPTS BASED ON COGNITIVE CONSIDERATION

BACKGROUND

The present invention relates to cognitive and contextual computing, and more particularly to systems, methods, and computer program products for enhanced e-mail return receipts based on cognitive considerations.

Electronic mail ("e-mail") is a store and forward messaging technology for composing, sending, storing, and receiving messages over electronic communication systems. E-mail is asynchronous and does not require the receiver of a message to be online at the time the message is sent or received. Existing e-mail systems enable a user to define an out of office message that is automatically sent as a reply to messages received during time periods when the user has indicated that he or she is not able to respond.

SUMMARY OF THE INVENTION

An embodiment of the invention provides a method for enhanced e-mail return receipts based on cognitive considerations. An input device receives an expected response time from a sender of an electronic message, wherein the expected response time includes the amount of time that the sender expects to receive a response to the electronic message. A processor generates a likelihood that the recipient of the electronic message will respond to the electronic message within the expected response time based on a profile of the recipient. The profile of the recipient includes the recipient's degree of attentiveness to the electronic message, the recipient's workload, the recipient's efficiency, and the recipient's work habits. A communications device presents the likelihood that the recipient will respond to the electronic message within the expected response time to the sender.

BRIEF DESCRIPTION OF THE SEVERAL VIEWS OF THE DRAWINGS

The present invention is described with reference to the accompanying drawings. In the drawings, like reference numbers indicate identical or functionally similar elements.

DETAILED DESCRIPTION

Exemplary, non-limiting, embodiments of the present invention are discussed in detail below. While specific configurations are discussed to provide a clear understanding, it should be understood that the disclosed configurations are provided for illustration purposes only. A person of ordinary skill in the art will recognize that other configurations may be used without departing from the spirit and scope of the invention.

Figure 1:
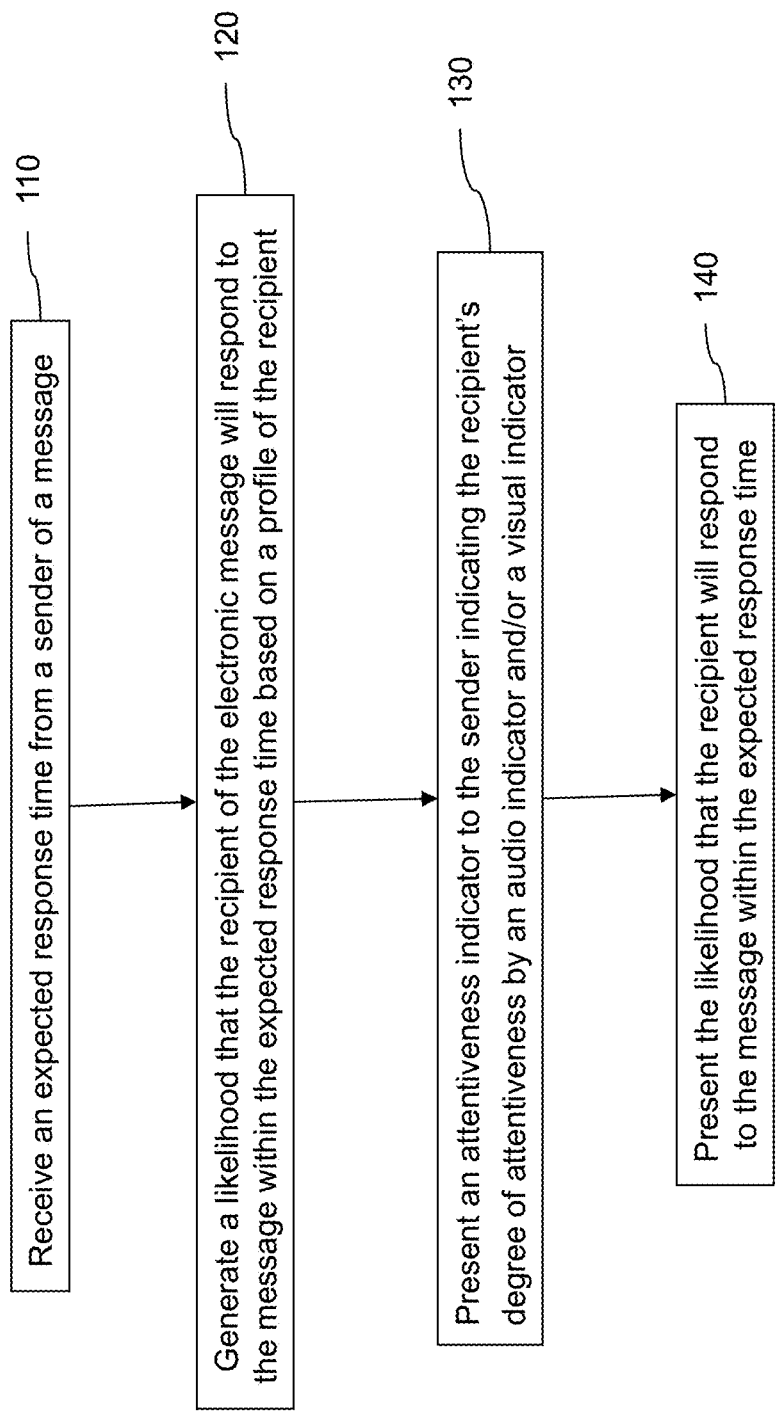
FIG. 1 is a flow diagram illustrating a method for enhanced e-mail return receipts based on cognitive considerations according to an embodiment of the invention.

FIG. 1 is a flow diagram illustrating a method for enhanced e-mail return receipts based on cognitive considerations according to an embodiment of the invention. An input device receives an expected response time from a sender of a message 110, wherein the expected response time includes the amount of time that the sender expects to receive a response to the electronic message. For example, a sender of an e-mail selects "2 hours" from a drop down menu to indicate that he expects to receive a response to his e-mail from the e-mail recipient within 2 hours from the time that the e-mail was sent.

A processor generates a likelihood that the recipient of the electronic message will respond to the message within the expected response time based on a profile of the recipient 120. The profile of the recipient can include the recipient's degree of attentiveness to the message, the recipient's workload, the recipient's efficiency, and/or the recipient's work habits.

In at least one embodiment of the invention, the recipient's degree of attentiveness to the message is based on the amount of the message that was scrolled after opening (e.g., 50%, 100%, 1 paragraph, 5 paragraphs), the number of times that the message was opened by the recipient, the number of times that the recipient viewed the message (e.g., as determined by a gaze detection device directed at the recipient and/or electronic wearable glasses (e.g., Google glasses)), including viewing the message in preview mode, and/or input from the recipient indicating that the recipient acknowledges receipt and comprehension of the message. Such input can be entered by the recipient, for example, by using a mouse, speaking a word, performing a gesture on the screen with fingers, etc. In one embodiment, such input is not in the form of an e-mail. If a recipient deletes a message without viewing it, the recipient's degree of attentiveness to the message may be negatively impacted (lower) because the recipient did not scroll, open, or view the email.

The processor can generate numerical scores for each degree of attentiveness factor, and factor the numerical scores to generate the recipient's degree of attentiveness to the message. For example, the processor can generate "100" for the amount of the message that was scrolled after opening (e.g., 100%), "100" for number of times that the message was opened (e.g., 3 times), "100" for the number of times that the recipient viewed the message (e.g., 3 times); and "0" for input from the recipient indicating that the recipient acknowledges receipt and comprehension of the message (e.g., no input received). In one embodiment, the degree of attentiveness factors are weighed equally, wherein the processor can generate a degree of attentiveness factor of 75. In another embodiment, the degree of attentiveness factors are not weighed equally (e.g., more or less weight is given to the "input from the recipient" factor with respect to the other factors).

An attentiveness indicator can be presented to the sender 130, wherein the attentiveness indicator indicates the recipient's degree of attentiveness by an audio indicator and/or a visual indicator without (lacking) text. In one embodiment, the attentiveness indicator is not sent to the sender's e-mail inbox. For example, the sender's interface can display an emoticon of a snoozing face with "zzzz"s next to the recipient when the recipient's degree of attentiveness is below a threshold (e.g., 40 degrees). As used herein, the term "present" (or "presented" or "presenting") can include displaying (e.g., on a display screen) and playing an audio or audiovisual file.

The recipient's work habits can include a numerical score indicating a tendency of the recipient to get interrupted from completing a task (e.g., because distracted by other tasks or distracted by other things). The recipient's workload can include projects and/or tasks that the recipient is currently working on and/or projects and/or tasks that the recipient is responsible for (i.e., assigned to the recipient, projects and/or tasks on the recipient's docket).

The recipient's efficiency can include the average amount of time needed by the recipient to read a message. The average may be replaced, depending on the application, by any measure of central tendency of response time, and any function of these measures, including a measure of central tendency plus some multiple of a measure of variance, such as one standard deviation. The recipient's efficiency can be learned by the system (e.g., the processor) by monitoring messages received and sent by the recipient. For example, by logging the amount of time that it takes for a recipient to read an e-mail (e.g., time that the e-mail was opened to the time that the e-mail was closes or another e-mail was opened) and the number of words or characters in the e-mail, the processor can calculate the recipient's efficiency. Moreover, the recipient's efficiency can be entered into the system by a user (e.g., the recipient, sender, or system administrator). For instance, the recipient can enter "50 words per minute" into the input device.

In at least one embodiment of the invention, the generating of the likelihood that a recipient of the message will respond to the message within the expected response time includes generating numerical scores for the recipient's degree of attentiveness to the message, the recipient's workload, the recipient's efficiency, and the recipient's work habits. The processor can factor the numerical scores to generate the likelihood that a recipient of the message will respond to the message. For example, when the recipient's degree of attentiveness to the message is 53, the recipient's workload is 75, the recipient's efficiency is 87, and the recipient's work habits is 80, the processor can calculate a likelihood that a recipient of the message will respond to the message within the expected response time of 74. In another embodiment, the recipient's degree of attentiveness, the recipient's workload, the recipient's efficiency, and the recipient's work habits are not weighed equally (e.g., more or less weight is given to the "work habits" factor with respect to the other factors). Each of the numerical scores can be a real value between 0 and 100. The processor can also weight the numerical scores by an importance coefficient. The importance coefficient can be different or the same between the different factors. A composite measure (C) weighted by these coefficients can be represented by several scores (C1, C2, C3, . . . ) using various weights (w1, w2, w3, . . . ) of importance, and the information from the scores may be analyzed according to the equation $C=w1*C1+w2*C2+w3*C3$. Often, a "primary" score (e.g., C1) may receive more weight (w). Weights may depend on various factors such as the predictive value of the score analyzed from historical data. Furthermore, the weights may derive from a nonlinear function of time and other factors pertaining to the score, its estimated validity, and the intrinsic dynamics of models of the individual's response likelihood, given the score. In this manner, the analysis of the "composite" score can function as an analysis of the individual's likelihood of responding within a specified period of time, given all measures.

The likelihood that the recipient will respond to the message within the expected response time is presented to the sender 140 with a communications device. For example, the communications device can send a message (e.g., e-mail, image, audio file, video file) to a device of the sender to be opened, displayed, or played to the sender.

In at least one embodiment of the invention, the processor can calculate the average response time for the recipient, wherein the average response time includes the average amount of time between the time that a message was sent to the recipient and the time that the recipient responds to the message. The communications device can send an alert to the sender of a new message and/or associates (e.g., work colleagues, employees, students, professors, peers, friends, contacts list) of the recipient when the recipient does not respond to the new message within the average response time after the new message was sent to the recipient.

At least one embodiment of the invention provides a system and method to compare a message sender's expectation of response to the message recipient's model of attentiveness, work habits, work load, efficiency, and/or predicted response time in order to generate a refined out-of-office ("OOO")-like message.

The system can assess the message recipient's current cognitive state, in particular a recipient's likelihood of "attentiveness over time" to messages in the medium, where "over time" is a sliding scale defined by the sender. The sender may adjust this scale upon sending the message, by answering a simple question such as: "What is your time expectation for a response? (1 hour, 1 day, 1 week, etc.)" If the model of the recipient does not meet this expectation within some confidence level, an OOO-like message can be generated to set a more appropriate expectation, e.g., "It is only 10% likely that the recipient will attend to this message in the next day."

In at least one embodiment, a cognitive model of the recipient's attentiveness to the medium measures (and adjusts to incorporate) the specific level of attentiveness paid to each message. In this way, a return receipt message may include additional information, such as, for example, "The message was received and attended to" or "The message was received and perused briefly." These interpretations of the information can be recipient specific, and thus generated by a cognitive mapping component, since different individuals incorporate ideas and information from an e-mail using different reading styles, amount of time, etc.

Other ways of gleaning that a recipient has paid attention to a received message can include the degree to which the recipient scrolled a received e-mail, the number of times the recipient has opened a received e-mail, and/or the number of times the recipient moved his or her eyes over an e-mail (e.g., as determined via biometrics associated with wearable physiological monitors and/or a camera on a computer, tablet, telephone, or other mobile device). Such parameters may contribute to an overall assessment of attentiveness.

Figure 2:
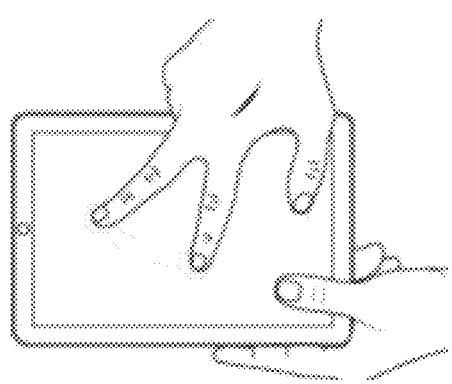
FIG. 2 illustrates a mobile device according to an embodiment of the invention.

The system can account for the fact that recipients have different attentive styles. For example, Cliff may be able to glance at an e-mail and in 10 seconds "get the gist" of the e-mail. However, Joe may tend to need more time. This style of attention may be stored in a profile and/or learned and/or set by the e-mail recipient or others (such as others in a social network or team). The recipient may also indicate that he or she paid attention to an e-mail (e.g., by using a mouse, speaking a word, performing a gesture on the screen with fingers, etc.) to optionally give the sender feedback without actually composing an e-mail. FIG. 2 illustrates a mobile device and a gesture performed by the hands of a message recipient on the screen of the mobile device, where the gesture can indicate that the recipient paid a certain degree of attention to the message but has not had time to respond.

The system can consider such information as perhaps a recipient took 45 minutes from the start of a reply e-mail to finish a thought because the recipient had to go back and re-gather herself repeatedly, for example, due to interruptions. The system can consider if the recipient moved from one unfinished task to another task. This suggests a kind of distraction level. For privacy reasons, one or more aspects of such recipient feedback may be held back from the sender.

In at least one embodiment, the system monitors the average response time of a user, and if he does not read nor respond to a message, the system sends an auto-response alerting team members that the recipient seems to be "inactive" and might not respond in time.

The recipient's "attentiveness" can be conveyed in a nuanced fashion using text, graphics, video, audio, etc. For example, a "snoring" sound could be played to the sender to indicate some aspect of the recipient's attentiveness to the sender's e-mail. Graphical icons or images may be used to provide feedback on attentiveness. For example, a photo of Albert Einstein can be sent or displayed to the sender of an e-mail to suggest high recipient attentiveness.

Figure 3:
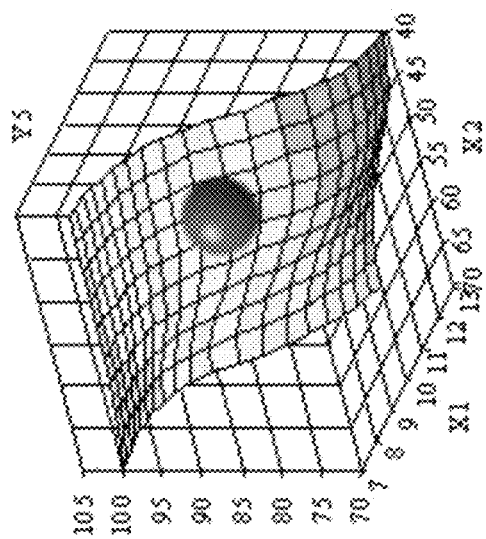
FIG. 3 is a graph illustrating multidimensional attentiveness space with slider for feedback to recipient according to an embodiment of the invention.

In a handshaking process, once the recipient's attentiveness measure is sent to the sender, the sender may graphically interact with the attentiveness measure in an effort to coax or suggest to the recipient that he or she should change her attentiveness measure (e.g., pay more attention). The attentiveness space can be multidimensional, and the sender can move a mouse cursor over the attentiveness space so as to provide feedback to the recipient as to what kind of attentiveness would be welcome. FIG. 3 is a graph illustrating multidimensional attentiveness space with slider for feedback to recipient according to an embodiment of the invention. The recipient can block such feedback if busy, but some recipients may actually want to know that a sender (in certain cases and for certain senders) is anxious about the need for a response.

Measures of attentiveness can be updated periodically to provide a sender with an ongoing estimate of the time to respond. In this way, the icons associated with a sent e-mail may be updated from those indicating inattentiveness to those indicating attentiveness. In some embodiments, exploiting reverse correlation of recipient's wearables data, the time to reply can be estimated with greater and greater accuracy as the actual send time approaches. Data from a recipient's wearables device can be stored in continuous circular buffer(s), and pushed to an accumulation data matrix in the cloud when a message is sent to the recipient. For example, data that was pushed to accumulation data matrix at the time of a message "A" sent to the recipient, is identified by block "A"; data that was pushed to accumulation data matrix at the time of a message "B" sent to the recipient is identified by block "B"; and data that was pushed to accumulation data matrix at the time of a message "C" sent to the recipient is identified by block "C".

Data from blocks A, B, and C can then used to determine a recipient's Message Triggered Average (MTA). A message response average matrix can be calculated as one-third (assuming that three messages occurred and were all responded to within the expected response time) of the sum of the values stored in each cell of the pushed blocks. That is, a push can result in three columns of nine cells. In one embodiment, the values in the upper left cell in each of the blocks are summed together, divided by three, and the quotient (i.e., average) is then stored in the upper left cell of the message response average matrix. Other cells can be similarly summed together, divided by three, and their quotients (i.e., averages) can be then stored in the corresponding cell of the message response average matrix. This message response average matrix can be then used as a "fuzzy" reference for new blocks pushed from the continuous circular buffer(s). That is, MTA can provide a mean average for each of the sensed parameters. Ranges around these mean values (above and below) can be predetermined, such that when values from the continuous circular buffer(s) later fall within these ranges, a likelihood that a recipient of the electronic message will respond to the electronic message within the expected response time can be estimated based on the user responding similarly to a message sent when continuous circular buffer(s) similarly fell within these ranges in the past.

Thus, the system can alert the sender that a reply is imminent, which may allow the sender to position him or herself in time and space, and cognitively, to be best situated to receive the response.

In at least one embodiment of the invention, if a message is sent to more than one person, the system assesses a group of message recipients' current cognitive states, in particular a set of recipients' "attentiveness over time" to messages in the medium, where "over time" is a sliding scale defined by the senders. The sender can adjust the scale upon sending the message by answering one or more questions, such as: "What is your time expectation for a response? (1 hour, 1 day, 1 week, etc.)". If the model of the set of recipients does not meet this expectation within some confidence level (e.g., for some number of recipients), an OOO message can be generated to set a more appropriate expectation (e.g., "It is only 10% likely that the recipient will attend to this message in the next day."). In this manner, the system can have utility for online bulletin boards, tweets, and the like.

The recipient can be made aware of when a task is taking too long or when a message is open for too long, taking into effect the cognitive style of the users. For example, the sender needs an answer within two (2) days; and, the recipient opens the message but takes no action (i.e., did not even start a draft note for response). The message can remain closed and re-queued to the top of the recipient's mail inbox to bring attention to the message. If, for example, there is a draft already started, the recipient can get an e-mail urging that he or she complete the response message (or hit the e-mail send button).

When reputation is a possible concern in e-mail management, the system can be useful to enhance reputation, or at least not lead to its decline, with respect to e-mail interactions dealing with attentiveness and responsiveness. The system can generate a return receipt and/or OOO message based on the attention actually given to the message by the recipient.

In at least one embodiment, the system compares the sender's expectation of response to the recipient's model of attentiveness and predicted response time in order to generate a refined OOO message. The recipient's style of attention can be learned and/or set by the recipient or others (such as others in a social network or team).

The recipient can also indicate that he or she paid attention to the message by, for example, using a mouse, speaking a word, and/or performing a gesture on the screen with fingers. Feedback can be provided to the sender without actually composing an e-mail.

Figure 4:
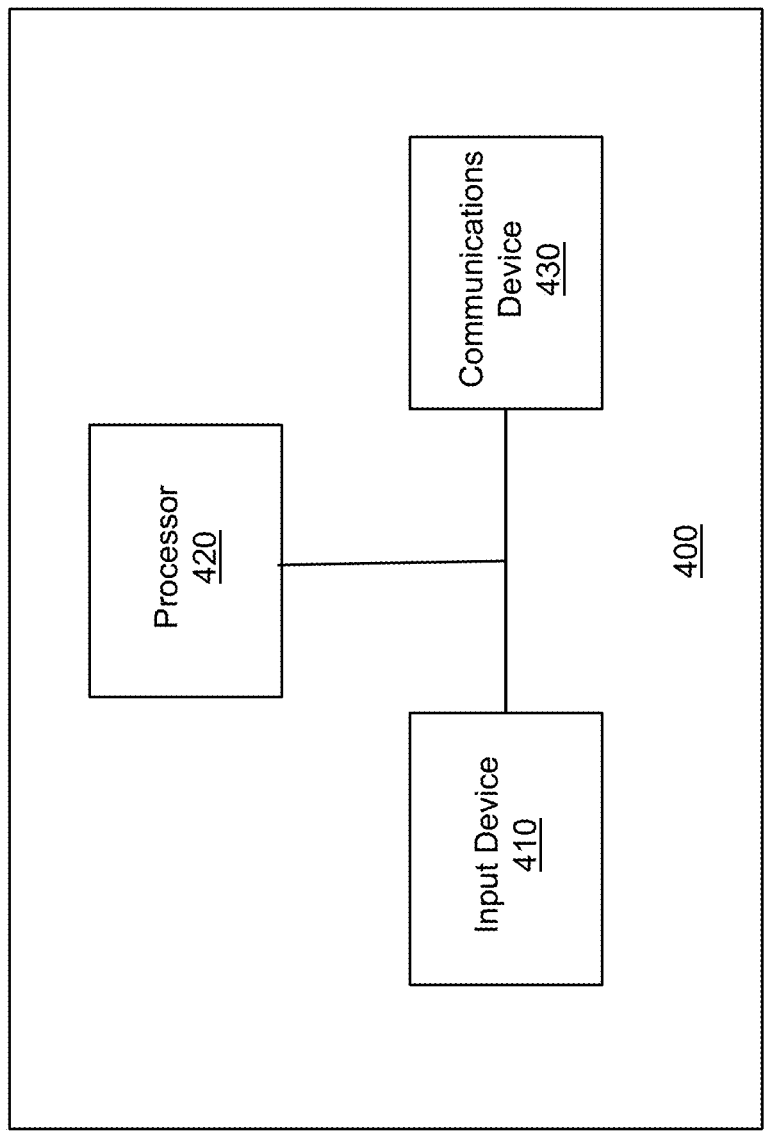
FIG. 4 is a diagram illustrating a hardware system for enhanced e-mail return receipts based on cognitive considerations according to an embodiment of the invention.

FIG. 4 is a diagram illustrating a hardware system 400 for enhanced e-mail return receipts based on cognitive considerations according to an embodiment of the invention. An input device 410 receives an expected response time from a sender of an electronic message, the expected response time including the amount of time that the sender expects to receive a response to the electronic message. As used herein, the term "input device" can include a computer hardware component for receiving input from a user (e.g., mouse, touchscreen, microphone, etc.).

A processor 420 connected to the input device 410 generates a likelihood that a recipient of the electronic message will respond to the electronic message within the expected response time based on a profile of the recipient. As used herein, the term "processor" can include a computer hardware device (e.g., CPU). Moreover, as used herein, the term "connected" includes operationally connected, logically connected, in communication with, physically or wirelessly connected, engaged, coupled, contacts, linked, affixed, and attached. The profile of the recipient can include the recipient's degree of attentiveness to the electronic message, the recipient's workload, the recipient's efficiency, and/or the recipient's work habits.

The recipient's degree of attentiveness to the electronic message can be based on the amount of the electronic message that was scrolled after opening, the number of times that the electronic message was opened, the number of times that the recipient viewed the electronic message as determined by a gaze detection device directed at the recipient, and/or input from the recipient indicating that the recipient acknowledges receipt and comprehension of the electronic message.

In at least one embodiment, a communications device 430 connected to the processor 420 presents an attentiveness indicator to the sender, wherein the attentiveness indicator indicates the recipient's degree of attentiveness by an audio indicator and/or a visual indicator without text, and wherein the attentiveness indicator is not sent to the sender's e-mail inbox. As used herein, the term "communications device" can include a computer hardware device (e.g., CPU, microprocessor) and/or a telephone.

The recipient's efficiency can include the average amount of time needed by the recipient to read an electronic message, wherein the recipient's efficiency can be learned by a system by monitoring electronic messages received and sent by the recipient, and/or entered into the system by a user. The recipient's work habits can include a numerical score indicating a tendency of the recipient to get interrupted from completing a task.

The processor 420 can generate numerical scores for the recipient's degree of attentiveness to the electronic message, the recipient's workload, the recipient's efficiency, and/or the recipient's work habits, and factor the numerical scores to generate the likelihood that a recipient of the electronic message will respond to the electronic message. Each of the numerical scores can be between 0 and 100. The processor 420 can weigh the numerical scores by an importance coefficient.

Furthermore, the processor 420 can calculate the average response time for the recipient, the average response time including an average amount of time between the time that an electronic message was sent to the recipient and the time that the recipient responds to the electronic message. The communications device 430 can sending an alert to the sender of a new electronic message and work associates of the recipient when the recipient does not respond to the new electronic message within the average response time after the new electronic message was sent to the recipient. Moreover, the communications device 430 can present the likelihood that the recipient will respond to the electronic message within the expected response time to the sender.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
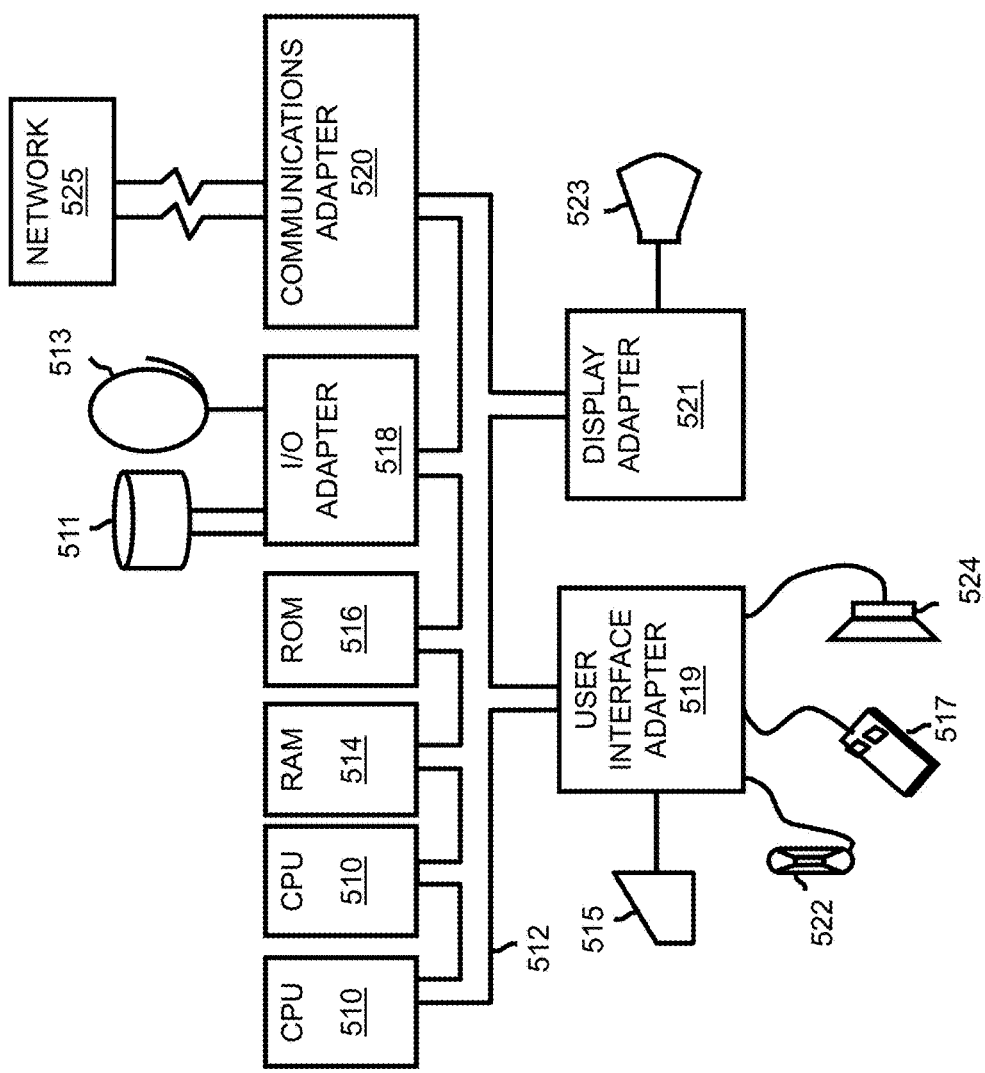
FIG. 5 is a diagram illustrating a computer program product according to an embodiment of the invention.

Referring now to FIG. 5, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 510. The CPUs 510 are interconnected with system bus 512 to various devices such as a random access memory (RAM) 514, read-only memory (ROM) 516, and an input/output (I/O) adapter 518. The I/O adapter 518 can connect to peripheral devices, such as disk units 511 and tape drives 513, or other program storage devices that are readable by the system. The system can read the inventive instructions on the program storage devices and follow these instructions to execute the methodology of at least one embodiment of the invention. The system further includes a user interface adapter 519 that connects a keyboard 515, mouse 517, speaker 524, microphone 522, and/or other user interface devices such as a touch screen device (not shown) to the bus 512 to gather user input. Additionally, a communication adapter 520 connects the bus 512 to a data processing network 525, and a display adapter 521 connects the bus 512 to a display device 523 which may be embodied as an output device such as a monitor, printer, or transmitter, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
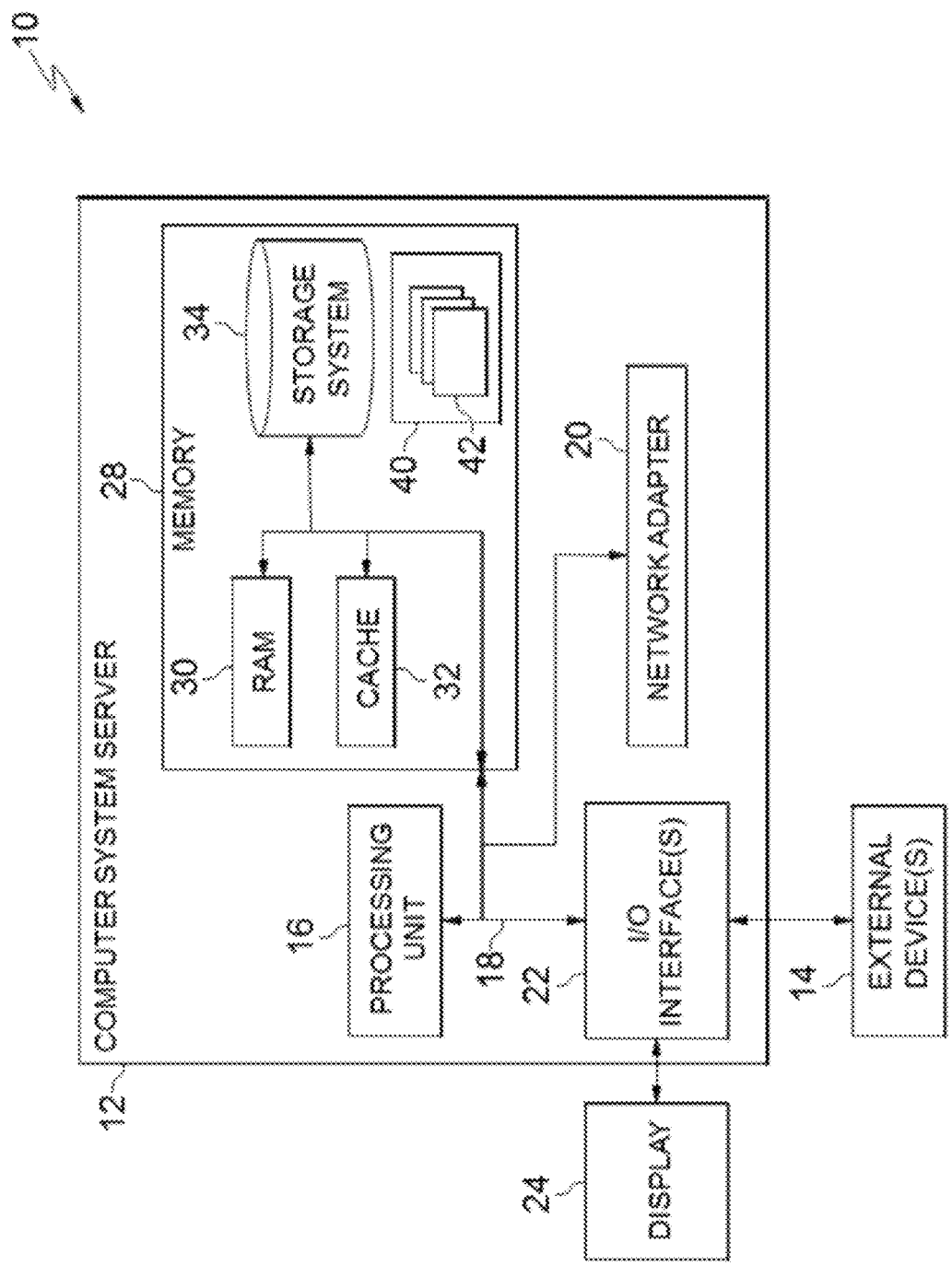
FIG. 6 depicts a cloud computing node according to an embodiment of the present invention.

Referring now to FIG. 6, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 7:
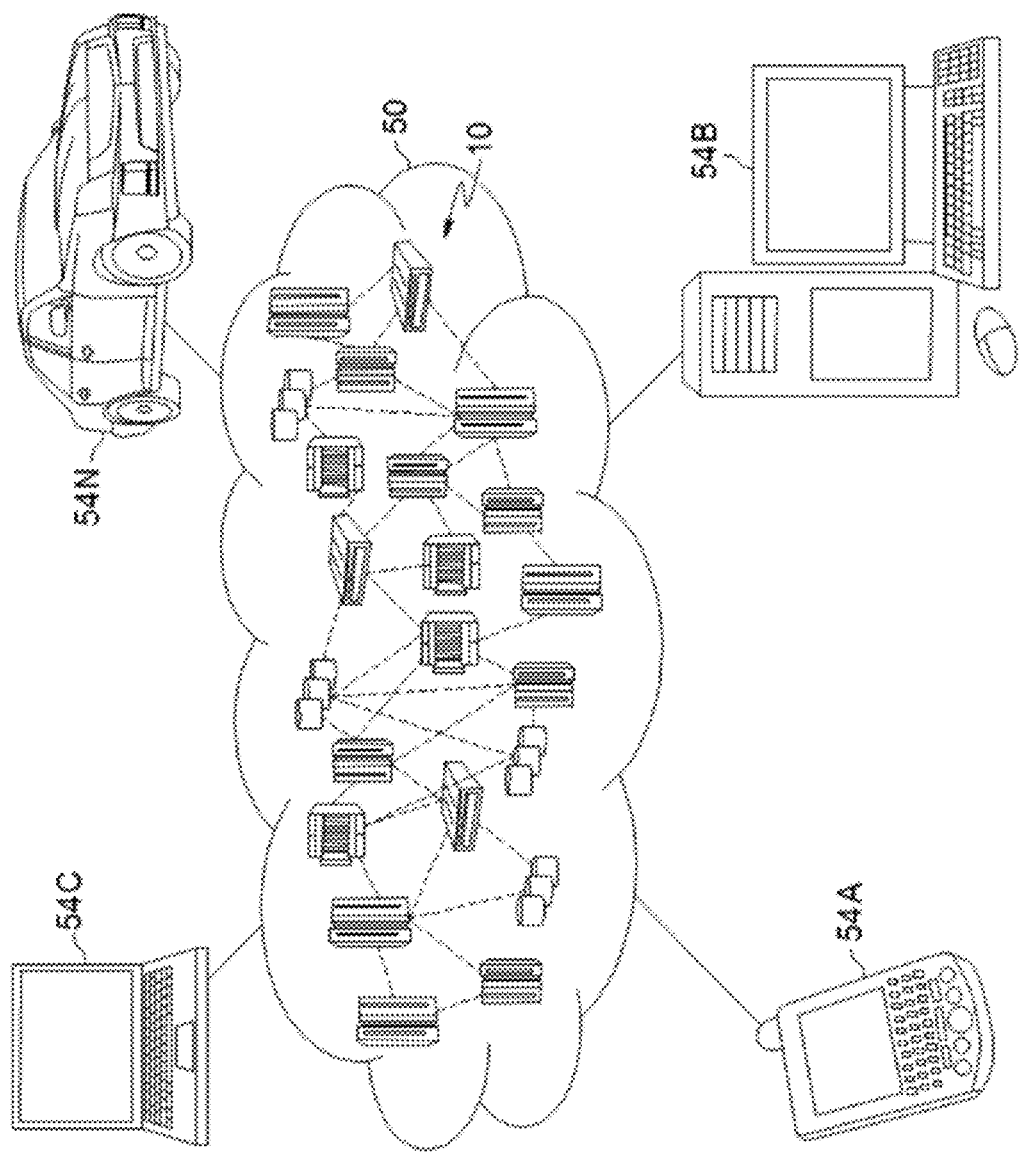
FIG. 7 depicts a cloud computing environment according to an embodiment of the present invention.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
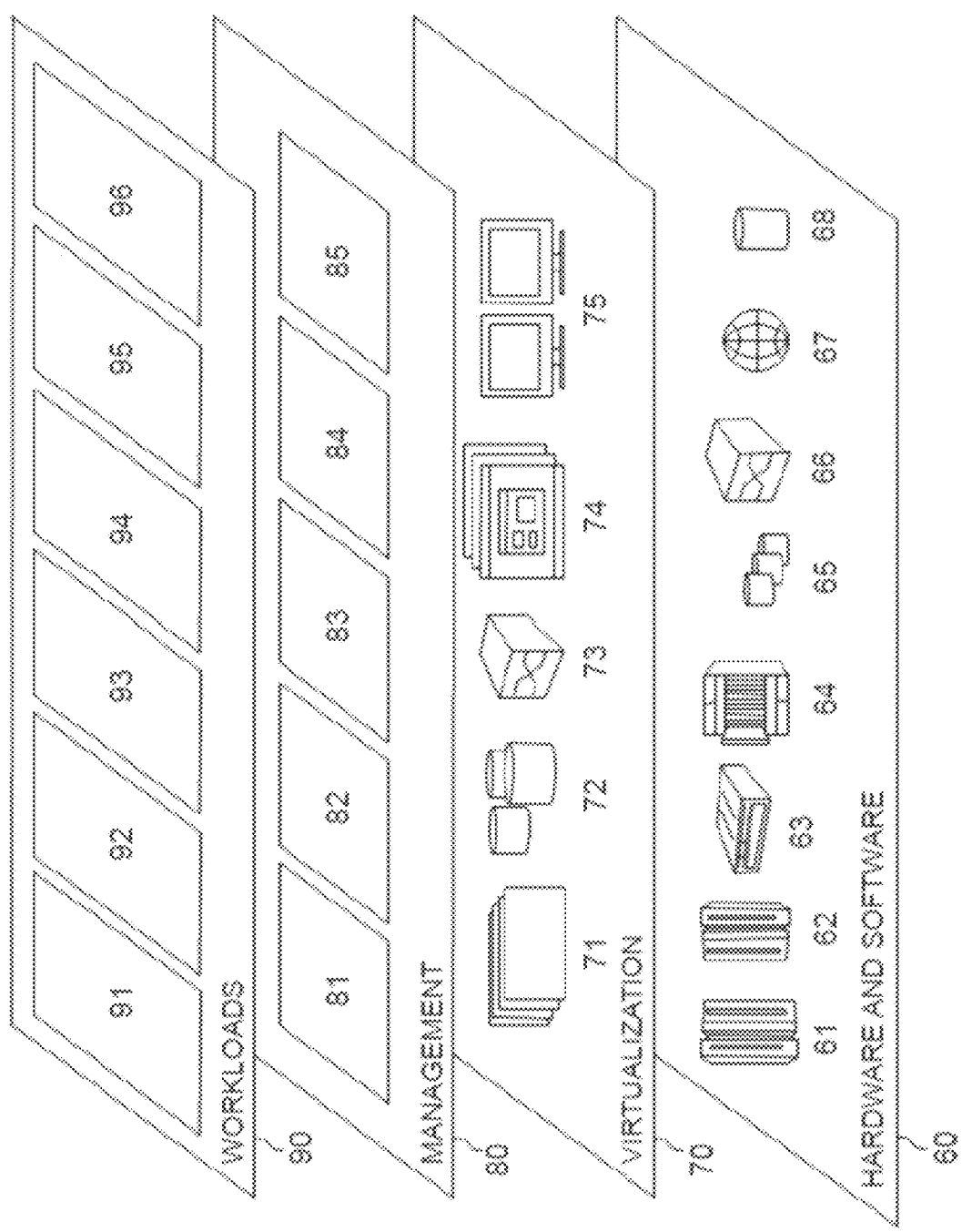
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and enhanced e-mail return receipts based on cognitive considerations 96.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of at least one other feature, integer, step, operation, element, component, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   receiving an expected response time from a sender of an electronic message with an input device, the expected response time including an amount of time that the sender expects to receive a response to the electronic message;
   generating a likelihood that a recipient of the electronic message will respond to the electronic message within the expected response time with a processor, the likelihood that the recipient of the electronic message will respond to the electronic message within the expected response time being generated based on a profile of the recipient; and
   presenting the likelihood that the recipient will respond to the electronic message within the expected response time to the sender with a communications device, wherein the profile of the recipient includes a recipient's work habits,
wherein the recipient's work habits include a numerical score indicating a tendency of the recipient to get interrupted from completing a task.

2. The method according to claim 1, wherein the profile of the recipient includes at least one measure of at least one of:
a recipient's degree of attentiveness to the electronic message,
a recipient's workload, and
a recipient's efficiency.

3. The method according to claim 2, wherein the recipient's degree of attentiveness to the electronic message is based on at least one of:
an amount of the electronic message that was scrolled after opening;
a number of times that the electronic message was opened;
a number of times that the recipient viewed the electronic message as determined by a gaze detection device directed at the recipient; and
input from the recipient indicating that the recipient acknowledges receipt and comprehension of the electronic message.

4. The method according to claim 3, further comprising:
presenting an attentiveness indicator to the sender with an electronic alerting system, the attentiveness indicator indicating the recipient's degree of attentiveness by at least one of an audio indicator and a visual indicator, wherein the attentiveness indicator is not sent to the sender's e-mail inbox.

5. The method according to claim 2, wherein a measure of the recipient's efficiency includes an amount of time needed by the recipient to read an electronic message, wherein the recipient's efficiency is at least one of:
learned by a system by monitoring electronic messages over time received and sent by the recipient, and
entered into the system by a user.

6. The method according to claim 1, wherein said generating of the likelihood that a recipient of the electronic message will respond to the electronic message within the expected response time includes:
generating numerical scores for each of the recipient's degree of attentiveness over time to the electronic message, the recipient's workload over time, and the recipient's efficiency over time; and
combining by a function the numerical scores to generate the likelihood that a recipient of the electronic message will respond to the electronic message.

7. The method according to claim 6, wherein at least one of the numerical scores is a real value stored in a cloud resource.

8. The method according to claim 6, further comprising:
weighing at least one of the numerical scores by an importance coefficient.

9. The method according to claim 6, further comprising:
weighing at least one of the numerical scores by function of time.

10. The method according to claim 1, further comprising:
calculating a measure of central tendency and a measure of variance of response time for the recipient, the measures of response time including an amount of time between a time that an electronic message was sent to the recipient and a time that the recipient responds to the electronic message; and
sending an alert to at least one of a sender of a new electronic message and work associates of the recipient when the recipient does not respond to the new electronic message within a period equal to the measure of central tendency of response time plus some multiple of the measure of variance after the new electronic message was sent to the recipient.

11. A method comprising:
receiving an expected response time from a sender of an electronic message with an input device, the expected response time including an amount of time that the sender expects to receive a response to the electronic message;
generating a likelihood that a recipient of the electronic message will respond to the electronic message within the expected response time with a processor, the likelihood that the recipient of the electronic message will respond to the electronic message within the expected response time being generated based on a profile of the recipient, the profile of the recipient including:
a recipient's work habits; and
presenting the likelihood that the recipient will respond to the electronic message within the expected response time to the sender with a communications device,
wherein the recipient's work habits include a numerical score indicating a tendency of the recipient to get interrupted from completing a task.

12. The method according to claim 11, further comprising:
calculating an average response time for the recipient, the average response time including an average amount of time between a time that an electronic message was sent to the recipient and a time that the recipient responds to the electronic message; and
sending an alert to a sender of a new electronic message and work associates of the recipient when the recipient does not respond to the new electronic message within the average response time after the new electronic message was sent to the recipient.

13. The method according to claim 11, wherein the profile of the recipient further includes:
a recipient's degree of attentiveness to the electronic message,
a recipient's workload, and
a recipient's efficiency.

14. The method according to claim 13, wherein the recipient's degree of attentiveness to the electronic message is based on:
an amount of the electronic message that was scrolled after opening,
a number of times that the electronic message was opened,
a number of times that the recipient viewed the electronic message as determined by a gaze detection device directed at the recipient, and
input from the recipient indicating that the recipient acknowledges receipt and comprehension of the electronic message.

15. The method according to claim 14, further comprising:
presenting an attentiveness indicator to the sender, the attentiveness indicator indicating the recipient's degree of attentiveness by an audio indicator and a visual indicator without text, wherein the attentiveness indicator is not sent to the sender's e-mail inbox.

16. The method according to claim 13, wherein the recipient's efficiency includes an average amount of time needed by the recipient to read an electronic message, wherein the recipient's efficiency is:
- learned by a system by monitoring electronic messages received and sent by the recipient, and
- entered into the system by a user.

17. The method according to claim 13, wherein said generating of the likelihood that a recipient of the electronic message will respond to the electronic message within the expected response time includes:
- generating numerical scores for each of the recipient's degree of attentiveness to the electronic message, the recipient's workload, the recipient's efficiency, and the recipient's work habits; and
- factoring the numerical scores to generate the likelihood that a recipient of the electronic message will respond to the electronic message.

18. A non-transitory computer-readable medium having computer-readable instructions stored thereon which when executed by the computer cause the computer to perform a method comprising:
- receiving an expected response time from a sender of an electronic message, the expected response time including an amount of time that the sender expects to receive a response to the electronic message;
- generating a likelihood that a recipient of the electronic message will respond to the electronic message within the expected response time based on a profile of the recipient, the profile of the recipient including a recipient's work habits; and
- presenting to the sender the likelihood that the recipient will respond to the electronic message within the expected response time,
- wherein the recipient's work habits include a numerical score indicating a tendency of the recipient to get interrupted from completing a task.

* * * * *